US012745757B2

(12) United States Patent
Fukui

(10) Patent No.: US 12,745,757 B2
(45) Date of Patent: Sep. 29, 2026

(54) WATER-DRINKING STATE IDENTIFICATION DEVICE, WATER-DRINKING STATE IDENTIFICATION PROGRAM, AND STORAGE MEDIUM

(71) Applicant: PACIFIC INDUSTRIAL CO., LTD., Ogaki (JP)

(72) Inventor: Toyoaki Fukui, Ogaki (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 363 days.

(21) Appl. No.: 18/566,315

(22) PCT Filed: Aug. 30, 2022

(86) PCT No.: PCT/JP2022/032668

§ 371 (c)(1),
(2) Date: Dec. 1, 2023

(87) PCT Pub. No.: WO2023/084877

PCT Pub. Date: May 19, 2023

(65) Prior Publication Data

US 2024/0358001 A1 Oct. 31, 2024

(30) Foreign Application Priority Data

Nov. 12, 2021 (JP) ................................ 2021-184547

(51) Int. Cl.
*A01K 29/00* (2006.01)

(52) U.S. Cl.
CPC ................................ *A01K 29/005* (2013.01)

(58) Field of Classification Search
CPC ......... A01K 29/005; A01K 29/00; A61B 5/07
See application file for complete search history.

(56) References Cited

U.S. PATENT DOCUMENTS

2017/0142937 A1 5/2017 De Groot
2022/0000388 A1 1/2022 Astl et al.

FOREIGN PATENT DOCUMENTS

CN 103916462 A 7/2014
CN 106993545 A 8/2017
(Continued)

OTHER PUBLICATIONS

Cantor, Melissa C., Joao HC Costa, and Jeffrey M. Bewley. "Impact of observed and controlled water intake on reticulorumen temperature in lactating dairy cattle." Animals 8.11 (2018): 194. (Year: 2018).*

(Continued)

*Primary Examiner* — Eric J Messersmith
(74) *Attorney, Agent, or Firm* — Oliff PLC

(57) ABSTRACT

A water-drinking state identification device includes: a change rate computing unit configured to compute a temperature change rate that is a change amount per unit time of an intragastric temperature measured by a temperature sensor disposed in a stomach of an animal; a first timing identification unit configured to identify, as a first timing, a timing at which the temperature change rate exceeds a first prescribed change amount and becomes negative; a second timing identification unit configured to identify, as a second timing, a timing at which the intragastric temperature is equal to or higher than a prescribed temperature and an absolute value of the temperature change rate falls within a second prescribed change amount after the first timing; and a water-drinking value computing unit configured to compute a water-drinking value that is a substitute value for an amount of water drunk between the first timing and the second timing.

13 Claims, 11 Drawing Sheets

(56) References Cited

FOREIGN PATENT DOCUMENTS

| | | | | | |
|---|---|---|---|---|---|
| CN | 113556936 | A | | 10/2021 | |
| EP | 3 540 679 | A1 | | 9/2019 | |
| JP | 2018-007613 | A | | 1/2018 | |
| JP | 2018-074992 | A | | 5/2018 | |
| JP | 2019165705 | A | * | 10/2019 | |
| KR | 20230033068 | A | * | 3/2023 | ............... G06T 7/20 |

OTHER PUBLICATIONS

Bewley et al., “Impact of Intake Water Temperatures on Reticular Temperatures of Lactating Dairy Cows,” Journal of Dairy Science, 2008, vol. 91, No. 10, pp. 3880-3887.
Feb. 8, 2022 Office Action issued in Japanese Patent Application No. 2021-184547.
Nov. 15, 2022 International Search Report issued in International Patent Application No. PCT/JP2022/032668.
Jun. 25, 2025 Office Action issued in Chinese Patent Application No. 202280040071.7.

* cited by examiner

FIG. 5

| IDENTIFICATION NUMBER | MEASUREMENT TIME t | INTRAGASTRIC TEMPERATURE F | TEMPERATURE CHANGE RATE ΔV | WATER-DRINKING FLAG | WATER-DRINKING VALUE Q |
|---|---|---|---|---|---|
| 688 | 2021/5/24 21:41 | 39.34 | --- | 0 | --- |
| 688 | 2021/5/24 21:52 | 35.88 | -3.46 | 1 | 2.60 |
| 688 | 2021/5/24 22:03 | 36.45 | 0.57 | 1 | 2.03 |
| 688 | 2021/5/24 22:14 | 35.23 | -1.22 | 1 | 3.25 |
| 688 | 2021/5/24 22:24 | 37.42 | 2.19 | 1 | 1.06 |
| 688 | 2021/5/24 22:35 | 38.10 | 0.68 | 1 | 0.38 |
| 688 | 2021/5/24 22:46 | 38.41 | 0.31 | 1 | 0.07 |
| 688 | 2021/5/24 22:56 | 38.48 | 0.07 | 0 | 0.00 |
| 688 | 2021/5/24 23:07 | 38.50 | 0.02 | 0 | --- |
| 688 | 2021/5/24 23:18 | 37.43 | -1.07 | 1 | 0.69 |
| 688 | 2021/5/24 23:29 | 37.96 | 0.53 | 1 | 0.16 |
| 688 | 2021/5/24 23:39 | 38.38 | 0.42 | 1 | -0.26 |
| 688 | 2021/5/24 23:50 | 38.12 | -0.26 | 0 | --- |
| 688 | 2021/5/25 00:12 | 36.4 | -1.72 | 1 | --- |

WATER-DRINKING STATE IDENTIFICATION DEVICE, WATER-DRINKING STATE IDENTIFICATION PROGRAM, AND STORAGE MEDIUM

TECHNICAL FIELD

The present disclosure relates to a water-drinking state identification device that identifies a water-drinking state of an animal, a water-drinking state identification program, and a storage medium.

BACKGROUND ART

Conventionally, as such type of water-drinking state identification device, a device that identifies a water-drinking state of an animal by a position sensor and an acceleration sensor attached to the animal has been known (see, for example, Patent Document 1).

RELATED ART DOCUMENTS

Patent Documents

Patent Document 1: JP 2018-007613 A (paragraph [0042]))

SUMMARY OF THE INVENTION

Problems to be Solved by the Invention

By the way, water-drinking behavior of an animal is greatly related to the health condition of the animal, and grasping of the water-drinking state is highly important in production management. However, in the conventional water-drinking state identification device, even an animal not actually performing water-drinking behavior for example, may be erroneously determined to perform the water-drinking behavior if the animal makes a similar movement to drinking water at a watering place. Therefore, development of a technology for suppressing occurrence of such a problem is required.

Means of Solving the Problems

A water-drinking state identification device according to a first aspect of the present disclosure made to solve the above problem includes: a change rate computing unit configured to compute a temperature change rate that is a change amount per unit time of an intragastric temperature to be measured by a temperature sensor disposed in a stomach of an animal; a first timing identification unit configured to identify, as a first timing, a timing at which the temperature change rate exceeds a first prescribed change amount set in advance and becomes negative; a second timing identification unit configured to identify, as a second timing, a timing at which the intragastric temperature is equal to or higher than a prescribed temperature set in advance and an absolute value of the temperature change rate falls within a second prescribed change amount set in advance after the first timing; and a water-drinking value computing unit configured to compute a water-drinking value that is a substitute value for an amount of water drunk between the first timing and the second timing on the basis of a time from the first timing to the second timing.

A water-drinking state identification program according to a second aspect of the present disclosure is configured to cause a computer to function as a water-drinking state identification device including: a change rate computing unit configured to compute a temperature change rate that is a change amount per unit time of an intragastric temperature to be measured by a temperature sensor disposed in a stomach of an animal; a first timing identification unit configured to identify, as a first timing, a timing at which the temperature change rate exceeds a first prescribed change amount set in advance and becomes negative; a second timing identification unit configured to identify, as a second timing, a timing at which the intragastric temperature is equal to or higher than a prescribed temperature set in advance and an absolute value of the temperature change rate falls within a second prescribed change amount set in advance after the first timing; and a water-drinking value computing unit configured to estimate an amount of water drunk between the first timing and the second timing or a substitute value for the amount of water drunk on the basis of a time from the first timing to the second timing.

BRIEF DESCRIPTION OF DRAWINGS

FIG. 5 is a diagram illustrating an example of data regarding a water-drinking state to be housed in a data storage unit.

MODE FOR CARRYING OUT THE INVENTION

First Embodiment

Figure 1:
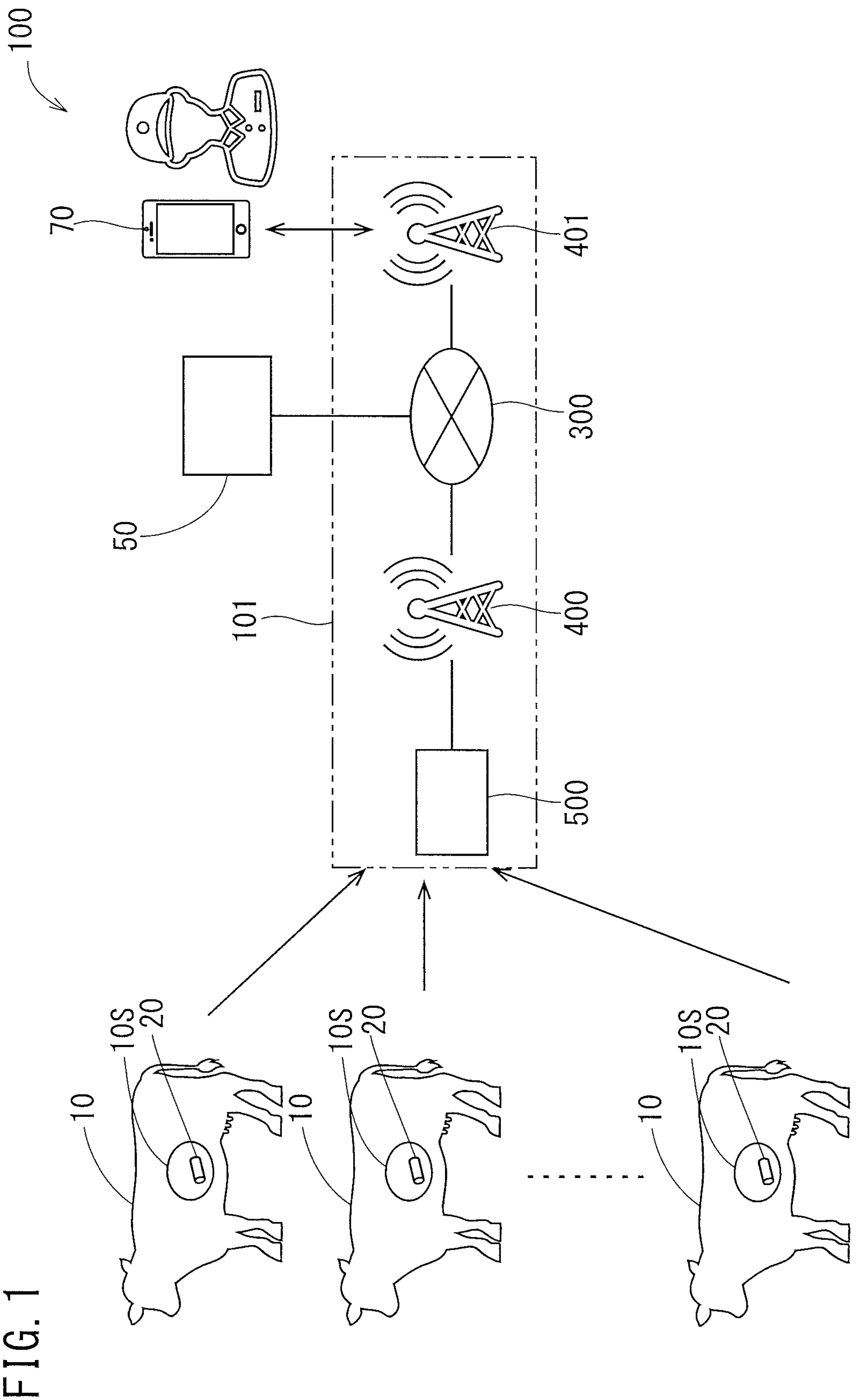
FIG. 1 is a schematic diagram illustrating an overall configuration of a monitoring system according to an embodiment of the present invention.

A first embodiment of a monitoring system 100 of the present disclosure will be described with reference to FIGS. 1 to 8. The monitoring system 100 of the present embodiment illustrated in FIG. 1 includes a plurality of intragastric terminals 20 to be placed in stomachs 10S (specifically, a first stomach or a second stomach) of a plurality of cows 10, a monitoring terminal 50 that monitors information on the cows 10 acquired by the intragastric terminals 20, and a user terminal 70 that receives provision of the information acquired by the intragastric terminals 20 via the monitoring terminal 50. These terminals are connected via a communication network 101 including radio base stations 400 and 401. Note that the monitoring terminal 50 corresponds to a "water-drinking state identification device" in the claims.

Figure 2:
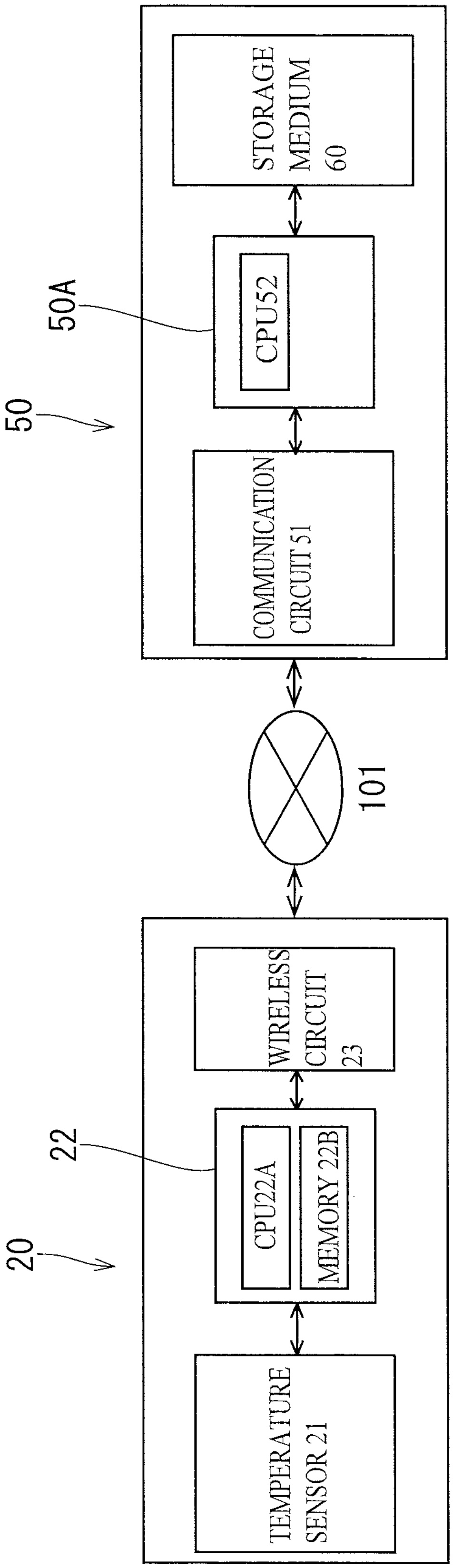
FIG. 2 is a block diagram illustrating an electrical configuration of an intragastric terminal and a monitoring terminal.

As illustrated in FIG. 2, the intragastric terminal 20 includes a temperature sensor 21, a device control unit 22, a wireless circuit 23, and the like, which are accommodated in a case (not illustrated) for protection from gastric acid and the like in the stomach 10S. A detection unit of the temperature sensor 21 is exposed to the outside of the case, measures the temperature in the stomach 10S of the cow 10, and transmits the measurement result to the device control unit 22. The device control unit 22 causes the wireless circuit 23 to wirelessly transmit a signal based on the measurement result of the temperature sensor 21. Note that a configuration may be adopted in which the intragastric terminal 20 also includes, for example, a pressure sensor, an acceleration sensor, or the like, and information other than the temperature in the stomach 10S is also transmitted as the condition of the cow 10.

The device control unit 22 includes a CPU 22A and a memory 22B. The CPU 22A is connected to devices such as the wireless circuit 23, the temperature sensor 21, and the like and controls these devices to execute a predetermined signal processing program. The memory 22B stores the signal processing program, an identification number set for each intragastric terminal 20, and the like. The CPU 22A executes the signal processing program to function as a control block including a trigger generation unit 24, a data generation unit 25, a data transmission unit 26, and the like in FIG. 3.

Note that the intragastric terminal 20 includes a battery (not illustrated) that supplies power to the device control unit 22, the wireless circuit 23, the temperature sensor 21, and the like. In addition, a weight (not illustrated) is accommodated in the case, and thus the intragastric terminal 20 is stably placed in the stomach 10S of the cow 10.

Figure 3:
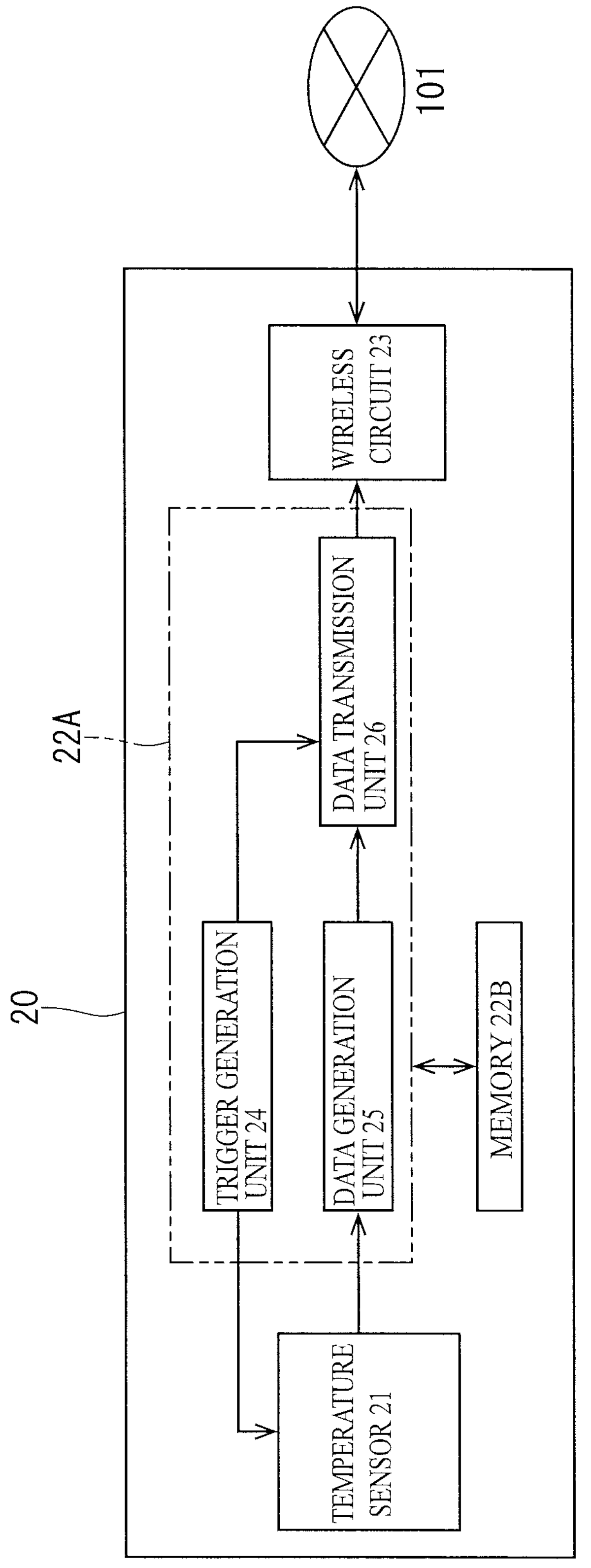
FIG. 3 is a block diagram illustrating a controlling configuration of the intragastric terminal.

Specifically, the intragastric terminal 20 operates as follows. That is, in the intragastric terminal 20, when the signal processing program is executed, as illustrated in FIG. 3, the trigger generation unit 24 generates a measurement trigger every certain period (for example, 1 [min]), and the temperature sensor 21 measures the temperature in the stomach 10S of the cow 10 every time the measurement trigger is generated. Then, the data generation unit 25 generates temperature data D1, which is information on the temperature in the stomach 10S, from the measurement result of the temperature sensor 21 and gives the temperature data D1 to the data transmission unit 26.

The data transmission unit 26 houses the identification number and the temperature data D1 of the intragastric terminal 20 in a data frame having a data length set in advance to generate transmission data D2. Here, the memory 22B temporarily accumulates the temperature data D1 generated by the data generation unit 25, and the data transmission unit 26 houses a plurality of pieces of temperature data D1, which is read from the memory 22B, in the transmission data D2 (in the present embodiment, for example, 10 pieces of temperature data D1 are housed). Then, the trigger generation unit 24 generates a transmission trigger every predetermined period (for example, 10 [min]), and the data transmission unit 26 wirelessly transmits the generated transmission data D2 using the wireless circuit 23 every time the transmission trigger is generated.

The transmission data D2 from the plurality of intragastric terminals 20 is received by the monitoring terminal 50. Specifically, as illustrated in FIG. 1, the transmission data D2 from the intragastric terminals 20 is first received by a gateway 500 installed in a cowhouse or a ranch where a plurality of cows 10 are raised. The gateway 500 has a function as a relay base station and a function of protocol conversion. Then, the gateway 500 transmits the transmission data D2 from the intragastric terminal 20 to the monitoring terminal 50 via a general-purpose communication line 300. In the present embodiment, one gateway 500 is connected to one monitoring terminal 50. However, the gateway 500 may be installed, for example, for each cowhouse or ranch, and a plurality of gateways 500 may be connected to one monitoring terminal 50.

The monitoring terminal 50 is constituted by a computer such as a server computer, a personal computer, or the like and discriminates the intragastric terminal 20 of the cow 10 having an abnormality on the basis of the temperature data D1 included in the transmission data D2 from the intragastric terminals 20, and notifies the user terminal 70 (see FIG. 1). As illustrated in FIG. 2, the monitoring terminal 50 includes at least a communication circuit 51, a control unit 50A including a CPU 52, a storage medium 60, and the like. Note that the monitoring terminal 50 may be a cloud server including a plurality of servers.

The communication circuit 51 receives the transmission data D2 from the intragastric terminals 20 via the general-purpose communication line 300, and transmits and receives data to and from the user terminal 70. Note that the communication circuit 51 corresponds to a "data reception unit" in the claims.

Figure 4:
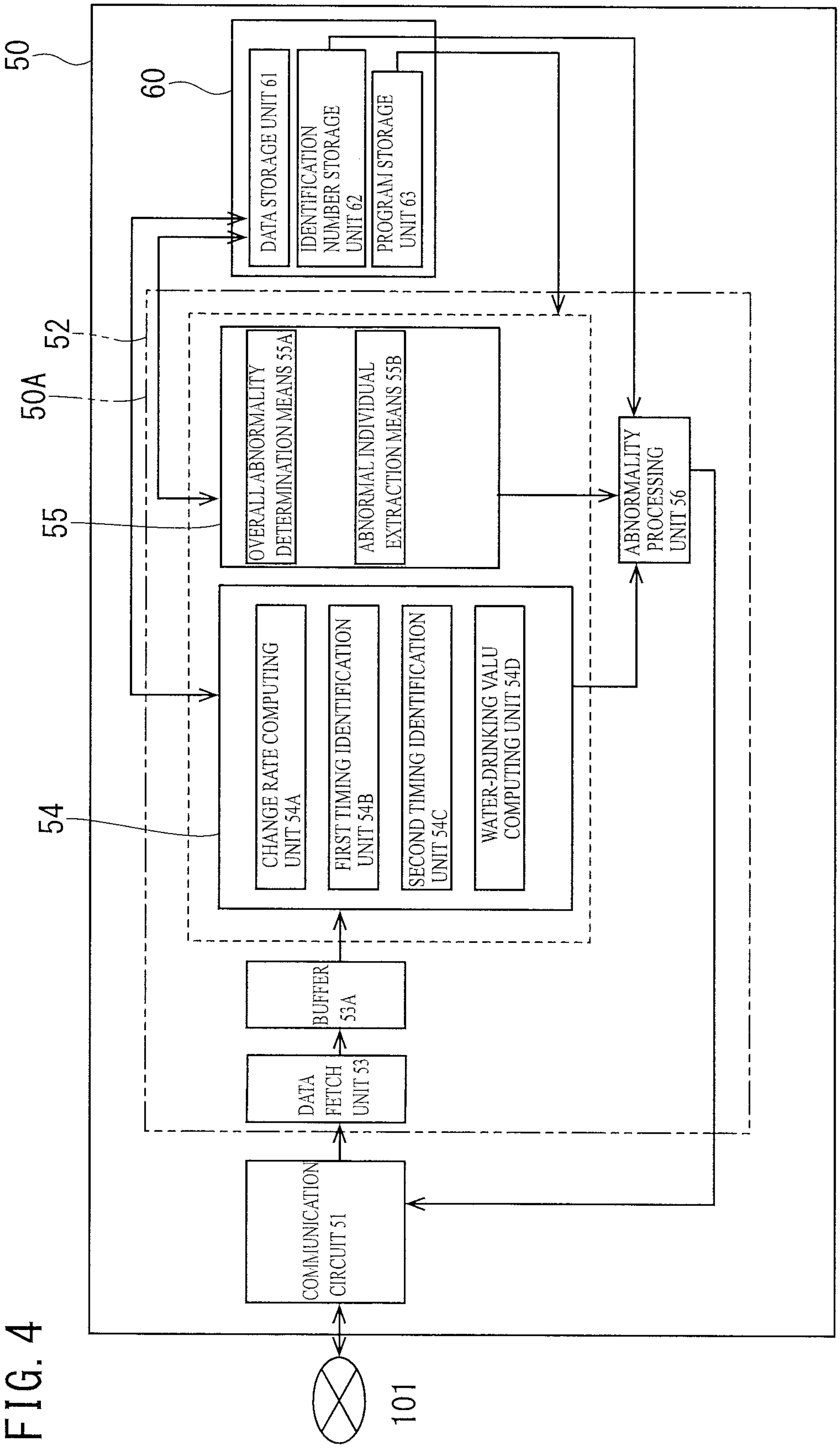
FIG. 4 is a block diagram illustrating a controlling configuration of the monitoring terminal.

The storage medium 60 includes a RAM, a hard disk, a flash memory, and the like, and includes a data storage unit 61, an identification number storage unit 62, a program storage unit 63, and the like as illustrated in FIG. 4. The data storage unit 61 houses various types of data and the like identified by a data analysis unit 54 to be described later on the basis of the temperature data D1 acquired from the intragastric terminals 20. The identification number of each intragastric terminal 20 is housed in the identification number storage unit 62, and each intragastric terminal 20 can be identified from the identification number. In addition, the program storage unit 63 houses a water-drinking state identification program PG1 and the like to be described later, and the CPU 52 executes the water-drinking state identification program PG1 to cause the monitoring terminal 50 to function as a water-drinking state identification device that identifies the water-drinking state of the cow 10.

Note that the water-drinking state identification program PG1 is not limited to the above configuration, and, for example, may have a configuration in which the water-drinking state identification program PG1 is stored in a CD-ROM, a USB memory, or the like that is a non-transitory storage medium and the CPU 52 reads and executes the water-drinking state identification program PG1, or a configuration in which the CPU 52 executes the water-drinking state identification program PG1 using a service such as an application through the general-purpose communication line 300.

The CPU 52 functions as a control block illustrated in FIG. 4 and includes for example, a data fetch unit 53 that fetches the transmission data D2 transmitted from the plurality of intragastric terminals 20 through the communication circuit 51, a data analysis unit 54 that functions when the water-drinking state identification program PG1 is executed, an abnormality identification unit 55, and the like.

The data fetch unit 53 performs data fetch processing; to receive the transmission data D2 transmitted from each intragastric terminal 20; to add the reception time; to classify the pieces of temperature data D1 included in the intragastric terminals 20 for each identification number; and to accumulate the temperature data D1 in a buffer 53A. Here, in the present embodiment, as described above, 10 pieces of temperature data D1 are housed in one piece of transmission data D2. In the data fetch processing, an average value of intragastric temperatures F included in the pieces of temperature data D1 is calculated, the average value is set as the intragastric temperature F of the transmission data D2, and the reception time is accumulated in the buffer 53A as a measurement time t of the intragastric temperature F.

The water-drinking state identification program PG1 is automatically executed, for example, once a day at a predetermined time. When the water-drinking state identification program PG1 is executed, the data analysis unit 54 generates data regarding the water-drinking state from the intragastric temperature F at each measurement time t of the day to identify the water-drinking state, and the abnormality identification unit 55 identifies whether or not there is an abnormality in the water-drinking state from the data regarding the water-drinking state. In the present embodiment, the water-drinking state identification program PG1 is executed once a day, but may be configured to be executed more than once a day.

As illustrated in FIG. 4, the data analysis unit 54 includes a change rate computing unit 54A, a first timing identification unit 54B, a second timing identification unit 54C, and a water-drinking value computing unit 54D.

The change rate computing unit 54A acquires the intragastric temperature F at each measurement time t from the buffer 53A, and computes the change amount in the intragastric temperature F per unit time Δt. In the present embodiment, the unit time Δt is set as a reception interval of the transmission data D2 of the data fetch unit 53. For example, the temperature change rate ΔV(n) at a measurement time t(n) is calculated by a difference obtained by subtracting an intragastric temperature F(n−1) at the immediately preceding measurement time t(n−1) from the intragastric temperature F(n). The calculated temperature change rate ΔV at each measurement time t is housed in the data storage unit 61 for each identification number. FIG. 5 illustrates an example of data regarding the water-drinking state to be housed in the data storage unit 61, and the temperature change rate ΔV at each measurement time is housed for each identification number.

The first timing identification unit 54B identifies a water-drinking start time at which water drinking is started on the basis of a change in the temperature change rate ΔV. Specifically, the measurement time t at which the temperature change rate ΔV exceeds a first prescribed change amount V1 set in advance and becomes negative is identified as a first timing T1. In the present embodiment, by utilizing the fact that the intragastric temperature F rapidly decreases when the cow 10 changes from a non-water-drinking state in which the cow 10 does not drink water to the water-drinking state, this timing of the decrease is estimated as the water-drinking start time (first timing T1). Note that the first prescribed change amount V1 is stored in the program storage unit 63, and in the present embodiment, the first prescribed change amount V1 is, for example, −0.3.

In a case where there is no measurement time t at which the temperature change rate ΔV exceeds the first prescribed change amount V1 and becomes negative, it means that water has not been drunk for a whole day. In this case, it is considered that an abnormal circumstance in which the cow 10 with that identification number cannot drink water may have actually occurred or the temperature sensor 21 may have failed. In either case, since it is necessary to take a measure urgently, the user terminal 70 is notified by an abnormality processing unit 56 (see FIG. 4) to be described later. Specifically, the intragastric terminal 20 corresponding to that identification number is identified from the data housed in the identification number storage unit 62. Abnormality determination data including information regarding that intragastric terminal 20, the determination time, and the abnormality is generated, and the abnormality determination data is transmitted to the user terminal 70.

The second timing identification unit 54C identifies, on the basis of the change in the temperature change rate ΔV, a period in which the intragastric temperature F deviates, due to water drinking, from the intragastric temperature F of the time when water is not contained in the stomach 10S. Specifically, after the measurement time t(T1) identified as the first timing T1 by the first timing identification unit 54B, the measurement time t at which the intragastric temperature F becomes equal to or higher than the first prescribed temperature F1 set in advance and the absolute value of the temperature change rate ΔV at that time is within the second prescribed change amount V2 set in advance is identified as a second timing T2. The section from the first timing T1 to the second timing T2 is identified as a water-drinking section. In the present embodiment, by utilizing a gradual increase in the intragastric temperature F when the cow 10 changes from the water-drinking state to the non-water-drinking state, the time when the increase is saturated is estimated as a water-drinking section end time (second timing T2). Note that, in the present embodiment, the first prescribed temperature F1 and the second prescribed change amount V2 are stored in the program storage unit 63. In the present embodiment, for example, the first prescribed temperature F1 is 38.0 [degrees], and the second prescribed change amount V2 is 0.1, for example.

As illustrated in FIG. 5, the second timing identification unit 54C sets a water-drinking flag in which the water-drinking section is set to 1 and a non-water-drinking section is set to 0, and houses the flag in the data storage unit 61.

Figure 6:
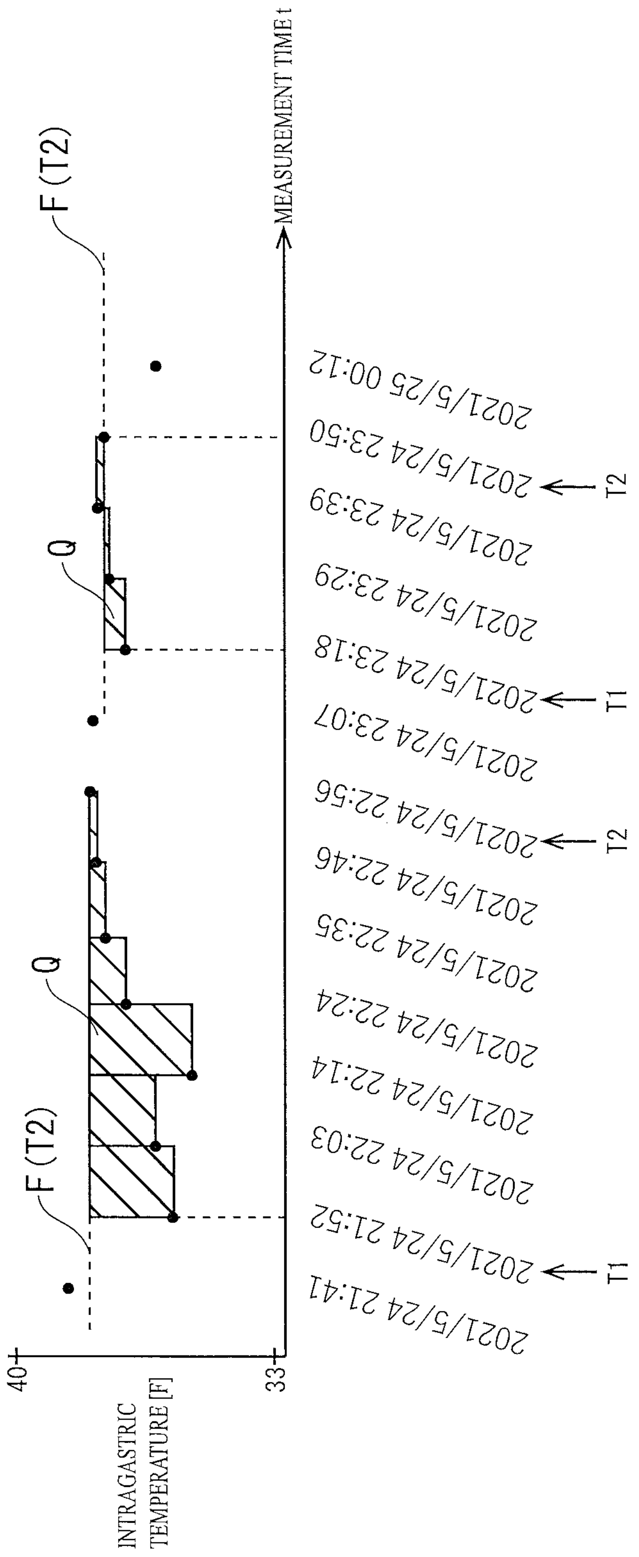
FIG. 6 is a diagram illustrating a method of calculating a water-drinking value.

The water-drinking value computing unit 54D identifies an amount of water drunk in each water-drinking section. In the present embodiment, by utilizing the fact that the absolute value of the change amount in the intragastric temperature F decreased by water drinking is proportional to the amount of water drunk, the total sum of differences obtained by subtracting the intragastric temperature F at each measurement time t of each water-drinking section from the intragastric temperature F(T2) at the second timing T2 of each water-drinking section is calculated as a water-drinking value Q and is used as a substitute value for the amount of water drunk. That is, as illustrated in FIG. 6, the water-drinking value Q is calculated from the sum of areas of a histogram that represents, using the intragastric temperature F(T2) at the second timing T2 as a reference, the distribution of the intragastric temperature F at each measurement time t in the water-drinking section by a rectangular area. Then, the water-drinking value Q is stored in the data storage unit 61 for each identification number (see FIG. 5). Here, the intragastric temperature F(T2) at the second timing T2 corresponds to a "reference temperature" in the claims.

Note that, in the present embodiment, the intragastric temperature F(T2) at the second timing T2 of each water-drinking section is used as the reference temperature, from which the intragastric temperature F at each measurement time t of the water-drinking section is subtracted. However, the reference temperature may be, for example, the intragastric temperature F(T1) at the first timing T1 of each water-drinking section, or may be an average value of the intragastric temperature F(T1) at the first timing T1 and the intragastric temperature F(T2) at the second timing T2.

The abnormality identification unit 55 identifies an abnormality on the basis of the data regarding the water-drinking state generated by the data analysis unit 54. The abnormality identification unit 55 includes an overall abnormality determination means 55A that determines whether there is an abnormality in the water-drinking state of the cow herd as a whole, and an abnormal individual extraction means 55B that extracts an individual having an abnormality in the water-drinking state from the entire cow herd as compared therewith.

For example, the overall abnormality determination means 55A computes, for each cowhouse, an average value of the total water-drinking values Qt of one day of all identification numbers of the cowhouse as an overall average value Qa1, and computes a difference between the overall average value Qa1 and a predetermined overall reference value Qs. In a case where the difference is smaller than a predetermined overall reference difference value ΔQ1, it is determined that there is no abnormality in the water-drinking state of the cow herd as a whole in the cowhouse. On the other hand, in a case where the difference is larger than the overall reference difference value ΔQ1, it is determined that there is abnormality in the water-drinking state of the cow herd as a whole in the cowhouse.

Note that, in the present embodiment, a configuration is adopted in which the abnormality is determined for each cowhouse by the difference between the average value (the overall average value Qa1) of the total water-drinking values Qt of all the identification numbers of the cowhouse and the overall reference value Qs. However, a configuration may be adopted in which the abnormality is determined by the difference between the median value of the total water-drinking values Qt of all the identification numbers of the cowhouse and the overall reference value Qs. In addition, the overall reference value Qs may be set for each cowhouse. In addition, although the overall reference value Qs is set in advance in the present embodiment, the overall reference value Qs may be an average value or a median value of the total water-drinking values Qt of all identification numbers of all the cowhouses.

The abnormal individual extraction means 55B, for example, compares a difference between the overall average value Qa1 computed by the overall abnormality determination means 55A and the total water-drinking value Qt of each identification number in one day with an individual reference difference value ΔQ2 set in advance, and determines the identification number for which the difference is smaller than the individual reference difference value ΔQ2 to be not abnormal, while determining the identification number for which the difference is larger than the individual reference difference value ΔQ2 to be abnormal.

Note that, in the present embodiment, a configuration is adopted in which the abnormality is determined by the difference from the average value (the overall average value Qa1) of the total water-drinking values Qt of all the identification numbers of that cowhouse. However, the abnormality may be determined by the difference from the average value of the total water-drinking values Qt of all the identification numbers of all the cowhouses.

Then, in a case where the abnormality identification unit 55 determines that there is an abnormality, the abnormality processing unit 56 notifies the user terminal 70 of the abnormality. Specifically, the intragastric terminal 20 corresponding to the identification number determined to be abnormal is identified from the identification number storage unit 62. Abnormality determination data including the information regarding the intragastric terminal 20, the determination time, and the abnormality is generated, and the abnormality determination data is transmitted to the user terminal 70. Note that not only in a case where it is determined that there is an abnormality but also in a case where there is no abnormality, the user terminal 70 may be notified of the data and the like illustrated in FIG. 5.

Note that livestock animal identification information (for example, a cowhouse number, an appearance photograph, or the like of the cow 10) of each cow 10 in which the intragastric terminal 20 is placed may be housed in the identification number storage unit 62 for each intragastric terminal 20, and the abnormality processing unit 56 may notify the user terminal 70 of the livestock animal identification information together with the abnormality determination data.

The user terminal 70 is, for example, a portable information terminal such as a personal computer, a tablet, a smartphone, or the like owned by a livestock owner or the like, and may be a general communication means capable of communicating with the monitoring terminal 50. As described above, the user terminal 70 receives a notification of abnormality determination data or the like from the monitoring terminal 50. In addition, it may be configured such that the user terminal 70 accesses the monitoring terminal 50 and the water-drinking state or the like of each cow 10 can be freely browsed on the monitoring terminal 50.

Figure 7:
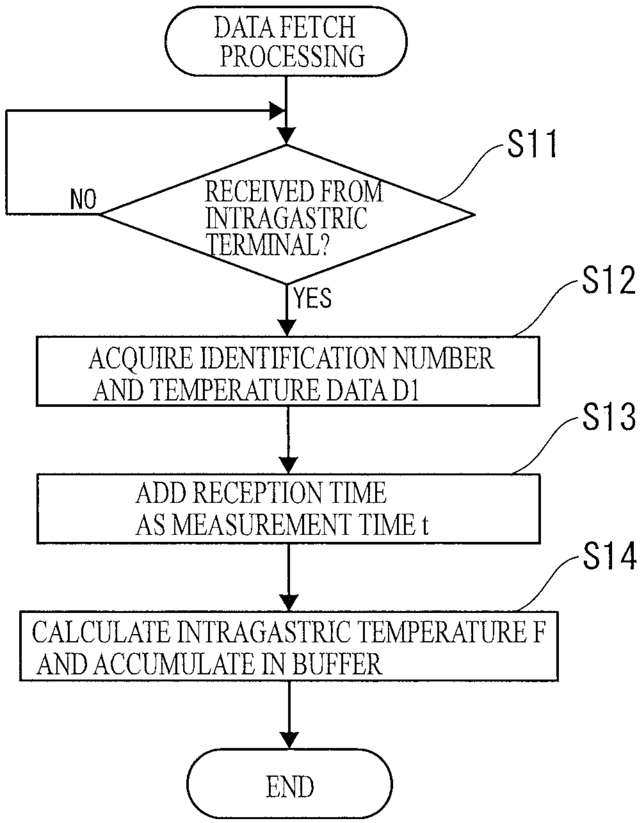
FIG. 7 is a flowchart illustrating data fetch processing.
Figure 8:
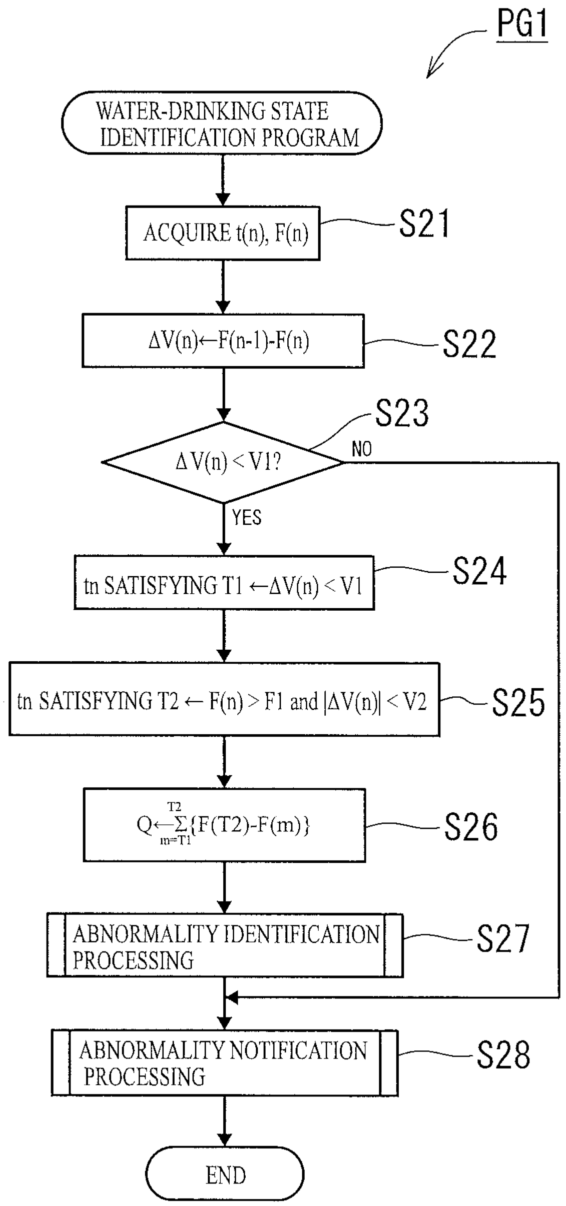
FIG. 8 is a flowchart of a water-drinking state identification program.

Hereinafter, an example of the data fetch processing by the data fetch unit 53 and an example of the water-drinking state identification program PG1, both executed by the CPU 52 of the control unit 50A, are illustrated in FIGS. 7 and 8.

As illustrated in FIG. 7, the data fetch processing is executed every time the transmission data D2 is received from the plurality of intragastric terminals 20 (YES in S11). Then, the identification number and the temperature data D1 are acquired from the received transmission data D2 (S12), and the reception time of the transmission data D2 is added as the measurement time t (S13). Then, an average value of the intragastric temperatures included in the temperature data D1 is calculated, and the average value is accumulated in the buffer 53A as the intragastric temperature F together with the measurement time t (S14).

The water-drinking state identification program PG1 is automatically started once a day at a predetermined time, and as illustrated in FIG. 8, each measurement time t(n) and the intragastric temperature F(n) of the day are acquired for each identification number from the buffer 53A in step S21. Then, as the change amount in the intragastric temperature F per unit time Δt, the temperature change rate ΔV(n) at the measurement time t(n) is calculated by F(n−1)−F(n) (S22).

Next, it is determined whether there is a temperature change rate ΔV(n) which exceeds the first prescribed change amount V1 and becomes negative (S23). When there is a temperature change rate ΔV(n) which exceeds the first prescribed change amount V1 and becomes negative (YES in S23), the measurement time t(n) at that time is set as the first timing T1 and identified as the water-drinking start time (S24). Here, in a case where there is no temperature change rate ΔV(n) which exceeds the first prescribed change amount V1 and becomes negative (NO in S23), as described above, a failure of the temperature sensor 21 or an abnormal circumstance in which the cow 10 cannot drink water has occurred. Then, the abnormality notification processing is executed in step S28, and the user terminal 70 is notified of the abnormality. The CPU 52 during execution of steps S21 and S22 corresponds to the above-described change rate computing unit 54A, and the CPU 52 during execution of steps S23 and S24 corresponds to the above-described first timing identification unit 54B.

Then, after the measurement time t(T1) identified as the first timing T1, the measurement time t(n) at which the intragastric temperature F(n) becomes equal to or higher than the predetermined first prescribed temperature F1 and the absolute value of the temperature change rate ΔV(n) at that time is within the second prescribed change amount V2 is set as the second timing T2, and is identified as the water-drinking section end time (S25). Here, the CPU 52 during execution of steps S21, S25 corresponds to the above-described second timing identification unit 54C.

Next, step S26 is executed to compute a water-drinking value Q that is a substitute value for the amount of water drunk. Specifically, in the water-drinking section in which the water-drinking flag is 1, the total sum of differences obtained by subtracting the intragastric temperature F at each measurement time t in the water-drinking section from the intragastric temperature F(T2) at the second timing T2 is calculated as the water-drinking value Q. Here, the CPU 52 during execution of steps S21 and S26 corresponds to the above-described water-drinking value computing unit 54D.

Next, abnormality identification processing to identify an abnormality on the basis of the water-drinking state data such as the identified first timing T1, second timing T2, and water-drinking value Q is executed (S27). Then, abnormality notification processing to generate, as abnormality determination data, information regarding an abnormality based on the abnormality identification processing together with the intragastric terminal 20 and the determination time and to notify the user terminal 70 is executed (S28). Here, the CPU 52 during execution of step S27 corresponds to the above-described abnormality identification unit 55, and the CPU 52 during execution of step S28 corresponds to the above-described abnormality processing unit 56.

The configuration of the monitoring system 100 of the present embodiment has been described above. In the monitoring system 100 of the present embodiment, the intragastric terminals 20 are placed in the respective stomachs 10S of the plurality of cows 10, and information on the intragastric temperatures F is wirelessly transmitted to the monitoring terminal 50. In the present embodiment, the monitoring terminal 50 utilizes the fact that the intragastric temperature F decreases when the cow 10 drinks water and the water enters the stomach 10S. The monitoring terminal 50 can determine that the water-drinking behavior has been performed when water enters the stomach 10S on the basis of the change in the intragastric temperature F. As a result, as compared with the conventional configuration in which the water-drinking behavior is identified by the movement of the cow 10, it is possible to suppress the occurrence of a problem of erroneous determination that the water-drinking behavior is performed although the cow 10 does not actually drink water.

In addition, the monitoring terminal 50 of the present embodiment utilizes the fact that the intragastric temperature F rapidly decreases immediately after drinking water. The monitoring terminal 50 can identify the water-drinking start time as the first timing T1. At that timing, the temperature change rate ΔV, which is the change amount per unit time of the intragastric temperature F, exceeds the first prescribed change amount V1 set in advance and becomes negative. Accordingly, it is also possible to identify a water-drinking frequency and a water-drinking interval.

Furthermore, the present embodiment utilizes the fact that the intragastric temperature F returns and gradually increases when water drinking is ended and the increase is eventually saturated. It is possible to identify a timing, as the second timing T2, at which the intragastric temperature F is equal to or higher than the first prescribed temperature F1 set in advance and the absolute value of the temperature change rate ΔV falls within the second prescribed change amount V2 set in advance, after the first timing T1. The second timing T2 is identified as the water-drinking section end time. Accordingly, it is possible to identify a water-drinking time zone (water-drinking section).

Moreover, the present embodiment utilizes the fact that the amount of water drunk is proportional to the absolute value of the change amount in the intragastric temperature F decreased by water drinking. The amount of water drunk in each water-drinking section can be calculated, as the water-drinking value Q which is a substitute value for the amount of water drunk, from the sum of the absolute values of the differences between the intragastric temperature F(T2) at the second timing T2 and the intragastric temperature F at each measurement time t in the water-drinking section. It is possible to grasp the daily change in the water-drinking state from the data regarding the water-drinking state.

In addition, in the present embodiment, since the information regarding the intragastric temperatures F measured by the plurality of intragastric terminals 20 is collected by the monitoring terminal 50 to generate data regarding the water-drinking state, it is possible to collectively monitor the plurality of cows 10 raised in a plurality of cowhouses or ranches. At this time, since the monitoring terminal 50 acquires the information on the intragastric temperatures F from the plurality of intragastric terminals 20 for each identification number, it is possible to distinguish and monitor the plurality of cows 10. In the present embodiment, since the abnormality identification unit 55 of the monitoring terminal 50 identifies the intragastric terminal 20 having the identification number whose data regarding the water-drinking state is abnormal, the burden on the livestock owner or the like is reduced.

In addition, the abnormality identification unit 55 of the present embodiment includes the overall abnormality determination means 55A, and determines whether or not there is an abnormality in the water-drinking state of the cow herd as a whole in the cowhouse according to whether or not a difference between an average value (overall average value Qa1) of the total water-drinking values Qt of all identification numbers and the overall reference value Qs exceeds the overall reference difference value ΔQ1 for each cowhouse. Here, in a case where the difference exceeds the overall reference difference value ΔQ1, the total amount of water drunk by the cow herd as a whole in that cowhouse is decreased or excessive. Thus, for example, it is possible to identify an abnormality that the cow herd as a whole cannot drink water due to a failure of equipment of a watering place of the cowhouse or a hygiene problem, or an abnormality that the cow herd as a whole in that cowhouse has a poor physical condition due to infection or the like and cannot drink water, or has drunk water excessively, or the like. As a result, it is possible to improve the water-drinking state of the cow herd as a whole in that cowhouse by increasing the number of watering places, improving the hygienic environment in the cowhouse, treating the infection, or the like.

In addition, the abnormality identification unit 55 of the present embodiment includes the abnormal individual extraction means 55B, and determines whether or not there is an abnormality in the water-drinking state of the identification number according to whether or not a difference between the overall average value Qa1 described above and the total water-drinking value Qt of each identification number exceeds the individual reference difference value ΔQ2. Here, in a case where the difference exceeds the individual reference difference value ΔQ2, the total amount of water drunk of that identification number is decreased or excessive. Thus, for example, it is possible to identify an abnormality in which the cow 10 cannot drink water due to hierarchical competition between the cows 10 and difficulty in standing caused by injury, illness, or the like, and an abnormality in which the cow 10 cannot drink water due to poor physical condition or the like or water has been drunk excessively, or the like. As a result, it is possible to identify the cow 10 having that identification number and improve the water-drinking state of the identified cow 10 by changing the cowhouse, performing treatment, or the like.

Second Embodiment

The present embodiment is different from the first embodiment in that the abnormality identification unit 55 includes an individual determination unit 57 that grasps a daily change in a water-drinking state for each identification number. Hereinafter, a monitoring terminal 50V of the present embodiment will be described only with respect to a configuration different from that of the monitoring terminal 50 of the first embodiment.

Figure 9:
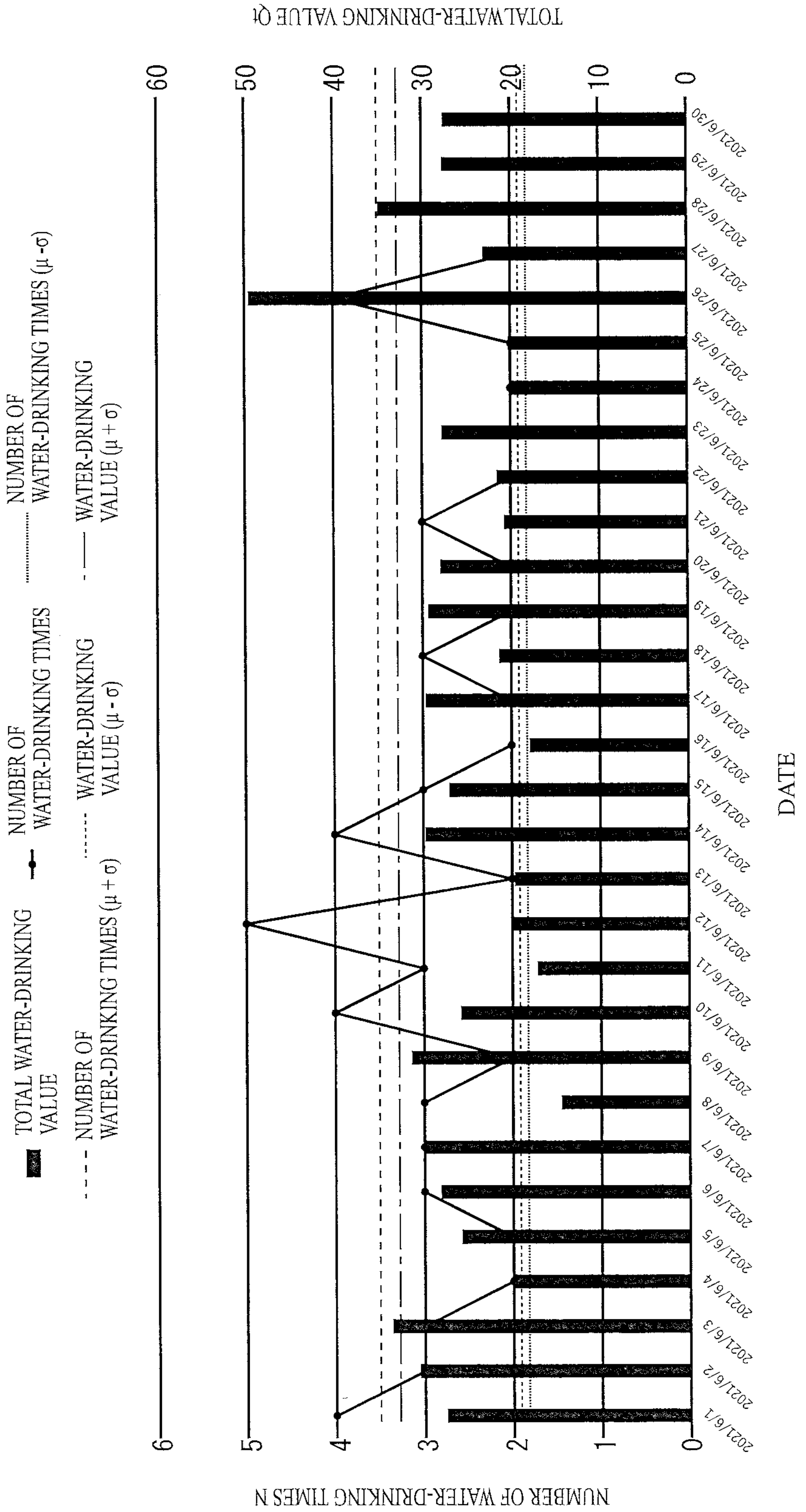
FIG. 9 is a diagram illustrating a graph showing changes in a total water-drinking value and the number of water-drinking times in one month according to a second embodiment.

The individual determination unit 57 monitors a daily change in the water-drinking state of each identification number for a predetermined period such as one week or one month. Specifically, for example, data regarding the water-drinking state for one month for each identification number is acquired from the data storage unit 61, and a graph showing changes in the total water-drinking value Qt and the number of water-drinking times N as illustrated in FIG. 9 is generated. As a result, a standard life style can be grasped for each identification number, and a change in physical condition can be individually monitored. In the present embodiment, an average value μ is obtained for each of the total water-drinking value Qt and the number of water-drinking times N in one month, and a standard deviation σ is acquired from the obtained average value μ. When the average value μ does not exceed μ±σ, it is determined that there is no abnormality in the water-drinking state of that identification number. On the other hand, when the average value μ exceeds μ±σ, it is determined that there is abnormality. Examples of the abnormality in this case include an abnormality in which the cow 10 cannot drink water due to hierarchical competition between the cows 10 and difficulty in standing caused by injury, illness, or the like, and an abnormality that water has been drunk excessively due to poor physical condition or the like.

Figure 10:
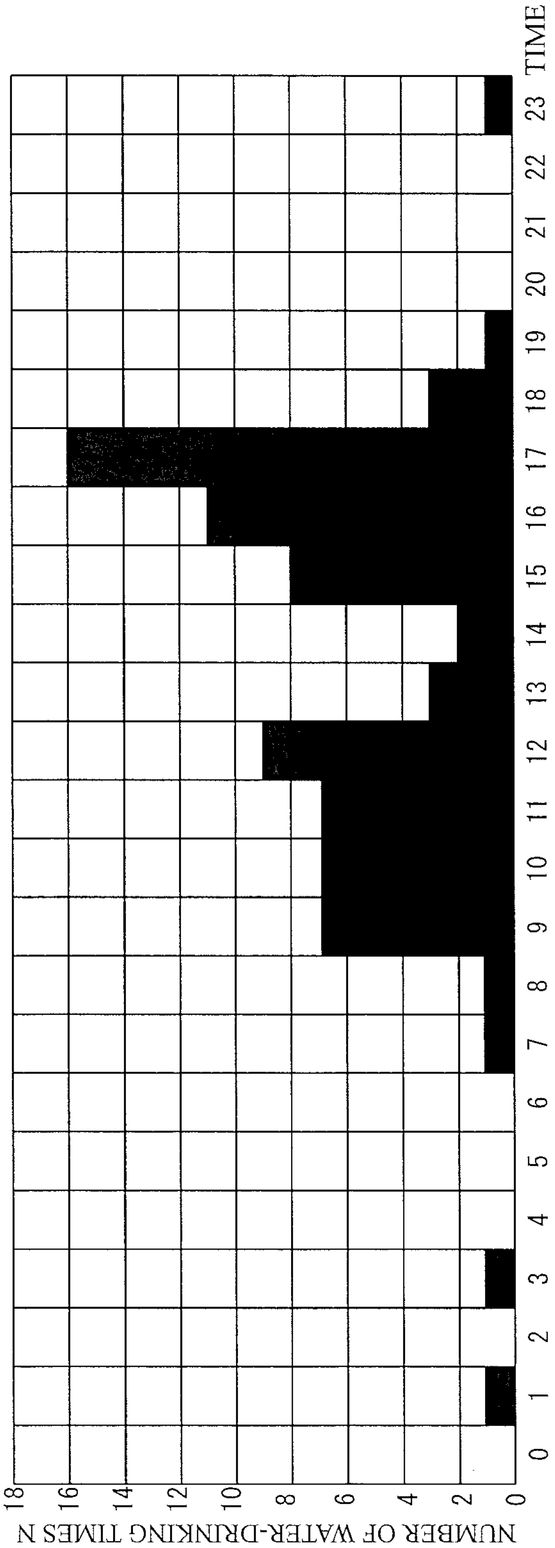
FIG. 10 is a diagram illustrating data obtained by forming a water-drinking section in one day into a histogram.

In addition, as illustrated in FIG. 10, histogram data of each water-drinking section in a day for 1 month is generated for each identification number. It is possible to grasp in which time zone water tends to be drunk for each identification number. As a result, it is possible to detect a cow 10 with an identification number that has not drunk water for a long time. Furthermore, the data can be utilized as an index of whether sufficient water can be supplied to a cowhouse whose time zones in which a large number of identification numbers drink water are overlapped, and as an index of management of number of cows raised in the cowhouse from the viewpoint of water supply, and it is possible to improve the water-drinking state by adding a watering place or the like.

Note that the individual determination unit 57 may be configured to execute the processing only for the identification number identified as having an abnormality by the abnormal individual extraction means 55B, or may be configured to execute the processing of the individual determination unit 57 together with the overall abnormality determination means 55A and the abnormal individual extraction means 55B whenever the water-drinking state identification program PG1 is executed. In addition, a configuration may be adopted in which the overall abnormality determination means 55A and the abnormal individual extraction means 55B are not included and only the individual determination unit 57 is included.

Third Embodiment

The present embodiment is different from the above-described embodiments in that a water-drinking value selection unit 58 is included instead of the water-drinking value computing unit 54D. Specifically, a data table obtained by actually measuring the correspondence relationship between a water-drinking time and an amount of water drunk is stored in advance in the program storage unit 63. Then, the water-drinking value selection unit 58 acquires the amount of water drunk corresponding to the water-drinking time in each water-drinking section from the data storage unit 61, and identifies the amount of water drunk in that water-drinking section.

Other Embodiments (1) In the above embodiments, the intragastric terminal 20 is placed in the stomach 10S of the cow 10, but may be placed in the stomach 10S of another animal.

(2) The data analysis unit 54 need not include the second timing identification unit 54C. Also with this configuration, the water-drinking start time can be identified, and therefore it is possible to identify the water-drinking state such as the water-drinking interval, the water-drinking frequency (the number of water drinking times), and the time zone in which water is drunk.

(3) In the above embodiments, the temperature change rate ΔV which is the change amount in the intragastric temperature F per unit time Δt is computed, and the presence or absence of the water-drinking behavior is identified by the temperature change rate ΔV. However, the presence or absence of the water-drinking behavior can also be identified by whether or not the intragastric temperature F is lower than a temperature set in advance.

(4) In the above embodiments, the overall abnormality determination means 55A and the abnormal individual extraction means 55B determine the presence or absence of abnormality by comparing the water-drinking value Qt. However, the presence or absence of abnormality may be determined by calculating the number of water-drinking times N (water-drinking frequency) in one day and comparing the number of water-drinking times N.

(5) In the above embodiments, the data transmission unit 26 is configured to collectively transmit, at a predetermined cycle, a plurality of measurement results measured by the temperature sensor 21 every fixed period, but may be configured to transmit the measurement results one by one every time the temperature sensor 21 performs measurement.

(6) In the above embodiments, the data fetch unit 53 adds the reception time to the transmission data D2 and accumulates the reception time in the buffer 53A as the measurement time t of the intragastric temperature F, but may be configured to house the actual measurement time of each temperature data D1 in the transmission data D2 and accumulate the actual measurement time in the buffer 53A as the measurement time t.

Figure 11:
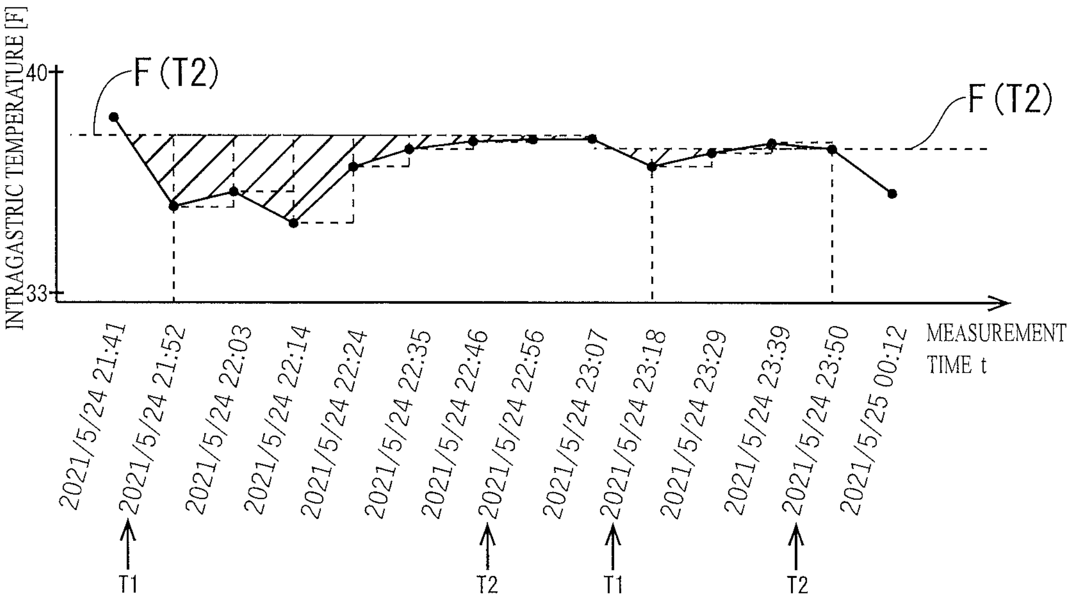
FIGS. 11(A) and (B) are diagrams illustrating methods of calculating a water-drinking value according to other embodiments.
Figure 11:
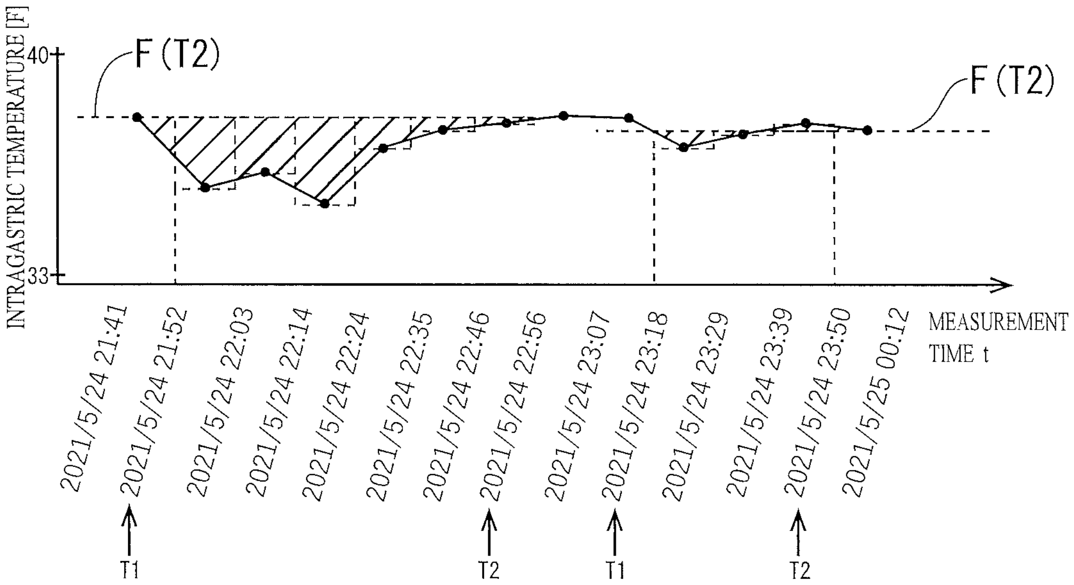

(7) In the above embodiments, the water-drinking value computing unit 54D is configured to calculate, as a substitute for the amount of water drunk, the water-drinking value Q from the sum of areas of the histogram that represents, using the intragastric temperature F(T2) at the second timing T2 as a reference, the distribution of the intragastric temperature F at each measurement time t in each water-drinking section by a rectangular area. However, as illustrated in FIG. 11(A), the water-drinking value Q may be calculated by an area surrounded by a frequency polygon connecting the distribution of the intragastric temperature F at each measurement time t and the intragastric temperature F(T2) at the second timing T2, or as illustrated in FIG. 11(B), the water-drinking value Q may be calculated by a frequency polygon obtained by taking the distribution of each intragastric temperature F with a median value between each measurement time t and the next measurement time t.

(8) When the cow 10 is a dairy cow, the amount of water drunk and the feed intake amount are reflected in the milking amount. Therefore, a configuration may be adopted in which a data table of the correspondence relationship between the water-drinking value Q and the milking amount obtained by actual measuring is housed in advance in the program storage unit 63 to allow estimation of the milking amount from the water-drinking value Q. In addition, a configuration may be adopted in which a data table of the correspondence relationship between the water-drinking value Q and the feed intake amount obtained by actual measuring is housed to allow estimation of the feed intake amount from the water-drinking value Q.

(9) In the above embodiments, the first prescribed change amount V1, the first prescribed temperature F1, and the second prescribed change amount V2 in the first timing identification unit 54B and the second timing identification unit 54C are set in advance, but may be set by a learning function. This learning function is a function to set the values from information on the intragastric temperatures F of the plurality of cows 10 collected in the past in a certain period. The certain period is, for example, data for the latest one week. In the present embodiment, a section in which the intragastric temperature F rapidly decreases and gradually returns is extracted from the data of one week and estimated as a water-drinking section. An average value or a median value of the temperature change rate ΔV when a value at the start of decrease in the section becomes maximum is set as the first prescribed change amount V1. An average value or a median value of the last intragastric temperature F in the section is set as the first prescribed temperature F1. An average value or a median value of an absolute value of the last temperature change rate ΔV in the section is set as the second prescribed change amount V2. At this time, by always using the intragastric temperature F for the latest one week to update the values, it is possible to deal with the changes in the life style of the cow 10 and the season and to improve the accuracy of the determination. In addition, the first prescribed change amount V1, the first prescribed temperature F1, and the second prescribed change amount V2 may be set using, for example, data of temperature and humidity one week ago, one month ago, or one year ago, instead of the intragastric temperature F for the latest one week. In addition, the first prescribed change amount V1, the first prescribed temperature F1, and the second prescribed change amount V2 may be set for each identification number.

(10) In the above embodiments, the data analysis unit 54 and the abnormality identification unit 55 are provided in one monitoring terminal 50, but may be provided in different terminals.

(11) In the above embodiments, the monitoring terminal 50 receives the transmission data D2 wirelessly transmitted from the intragastric terminal 20, and the CPU 52 included in the monitoring terminal 50 executes the water-drinking state identification program PG1 to function as the "water-drinking state identification device" that identifies the water-drinking state of the cow 10. However, a configuration may be adopted in which the CPU 52 is included in the intragastric terminal 20.

Note that, although specific examples of the technology included in the claims are disclosed in the present specification and the drawings, the technology described in the claims is not limited to these specific examples, and includes those obtained by variously modifying and changing the specific examples, and also includes those obtained by singly extracting a part from the specific examples.

REFERENCE SIGNS LIST 10 cow (animal)
10S stomach
20 intragastric terminal
21 temperature sensor
50 monitoring terminal (computer, water-drinking state identification device)
51 communication circuit(data reception unit)
54A change rate computing unit
54B first timing identification unit
54C second timing identification unit
54D water-drinking value computing unit
55 abnormality identification unit
60 storage medium
F intragastric temperature
F(T2) reference temperature
F1 first prescribed temperature (prescribed temperature)
PG1 water-drinking state identification program
Q water-drinking value
T1 first timing
T2 second timing
V1 first prescribed change amount
V2 second prescribed change amount
ΔV temperature change rate

The invention claimed is:

1. A water-drinking state identification device comprising:
a processor programmed to:
compute a temperature change rate that is a change rate amount per unit time of an intragastric temperature to be measured by a temperature sensor disposed in a stomach of an animal;
identify, as a first timing, a timing at which the temperature change rate exceeds a first prescribed change rate amount set in advance and becomes negative;
identify, as a second timing, a timing at which the intragastric temperature becomes equal to or higher than a prescribed temperature set in advance and an absolute value of the temperature change rate becomes less than a second prescribed change rate amount set in advance after the first timing; and
compute a water-drinking value that is a substitute value for an amount of water drunk between the first timing and the second timing based on a time from the first timing to the second timing.

2. The water-drinking state identification device according to claim 1, wherein the processor is programmed to compute the water-drinking value based on a sum of absolute values of differences between a plurality of intragastric temperatures and a reference temperature for each of the unit time included between the first timing and the second timing.

3. The water-drinking state identification device according to claim 1, further comprising a data reception unit configured to wirelessly acquire, from a plurality of intragastric terminals disposed in the respective stomachs of a plurality of the animals and each including the temperature sensor, information regarding the intragastric temperatures and identification numbers of the intragastric terminals, wherein the processor is programmed to compute the water-drinking value for each of the identification numbers.

4. The water-drinking state identification device according to claim 2, further comprising a data reception unit configured to wirelessly acquire, from a plurality of intragastric terminals disposed in the respective stomachs of a plurality of the animals and each including the temperature sensor, information regarding the intragastric temperatures and identification numbers of the intragastric terminals, wherein the processor is programmed to compute the water-drinking value for each of the identification numbers.

5. The water-drinking state identification device according to claim 3, wherein the processor is programmed to identify the identification number for which the amount of water drunk or the substitute value is abnormal as compared with a whole of a plurality of the identification numbers.

6. The water-drinking state identification device according to claim 4, wherein the processor is programmed to identify the identification number for which the amount of water drunk or the substitute value is abnormal as compared with a whole of a plurality of the identification numbers.

7. A water-drinking state identification method for controlling a computer to function as a water-drinking state identification device comprising:

computing a temperature change rate that is a change rate amount per unit time of an intragastric temperature to be measured by a temperature sensor disposed in a stomach of an animal;

identifying, as a first timing, a timing at which the temperature change rate exceeds a first prescribed change rate amount set in advance and becomes negative;

identifying, as a second timing, a timing at which the intragastric temperature becomes equal to or higher than a prescribed temperature set in advance and an absolute value of the temperature change rate becomes less than a second prescribed change rate amount set in advance after the first timing; and estimating an amount of water drunk between the first timing and the second timing or a substitute value for the amount of water drunk based on a time from the first timing to the second timing.

8. The water-drinking state identification method according to claim 7, wherein the method comprises computing the water-drinking amount based on a sum of absolute values of differences between a plurality of intragastric temperatures and a reference temperature for each of the unit time included between the first timing and the second timing.

9. The water-drinking state identification method according to claim 7, comprising executing, by a computer included in a terminal disposed outside the animal including a data reception unit, wirelessly acquiring, from a plurality of intragastric terminals disposed in the respective stomachs of a plurality of the animals and each including the temperature sensor, information regarding the intragastric temperatures and identification numbers of the intragastric terminals.

10. The water-drinking state identification method according to claim 8, comprising executing, by a computer included in a terminal disposed outside the animal including a data reception unit, wirelessly acquiring, from a plurality of intragastric terminals disposed in the respective stomachs of a plurality of the animals and each including the temperature sensor, information regarding the intragastric temperatures and identification numbers of the intragastric terminals.

11. The water-drinking state identification method according to claim 9, comprising causing the computer to function as the water-drinking state identification device that identifies the identification number for which the amount of water drunk or the substitute value is abnormal as compared with a whole of a plurality of the identification numbers.

12. The water-drinking state identification method according to claim 10, comprising causing the computer to function as the water-drinking state identification device that identifies the identification number for which the amount of water drunk or the substitute value is abnormal as compared with a whole of a plurality of the identification numbers.

13. A non-transitory computer readable storage medium storing a program for executing a water-drinking state identification method comprising:

computing a temperature change rate that is a change rate amount per unit time of an intragastric temperature to be measured by a temperature sensor disposed in a stomach of an animal;

identifying, as a first timing, a timing at which the temperature change rate exceeds a first prescribed change rate amount set in advance and becomes negative;

identifying, as a second timing, a timing at which the intragastric temperature becomes equal to or higher than a prescribed temperature set in advance and an absolute value of the temperature change rate becomes less than a second prescribed change rate amount set in advance after the first timing; and estimating an amount of water drunk between the first timing and the second timing or a substitute value for the amount of water drunk based on a time from the first timing to the second timing.

* * * * *